(12) United States Patent
Sirohey et al.

(10) Patent No.: US 8,165,358 B2
(45) Date of Patent: Apr. 24, 2012

(54) SYSTEM AND METHOD FOR OVERLAYING COLOR CUES ON A VIRTUAL REPRESENTATION OF AN ANATOMICAL STRUCTURE

(75) Inventors: Saad Ahmed Sirohey, Pewaukee, WI (US); Gopal B. Avinash, New Berlin, WI (US); Jerome Francois Knoplioch, Neuilly sur Seine (FR); Laurent Launay, impasse de Sargis (FR); Renaud Capolunghi, Vanves (FR)

(73) Assignee: GE Medical Systems Global Technology Co., LLC, Waukesha, WI (US)

( * ) Notice: Subject to any disclaimer, the term of this patent is extended or adjusted under 35 U.S.C. 154(b) by 2156 days.

(21) Appl. No.: 10/756,872

(22) Filed: Jan. 12, 2004

(65) Prior Publication Data

US 2005/0152587 A1 Jul. 14, 2005

(51) Int. Cl.
*G06K 9/00* (2006.01)
*G09G 5/00* (2006.01)
*G09G 5/02* (2006.01)

(52) U.S. Cl. ........ 382/128; 382/131; 382/132; 382/154; 345/589; 345/629

(58) Field of Classification Search .................. 382/128, 382/131, 132, 154; 345/589, 629
See application file for complete search history.

(56) References Cited

U.S. PATENT DOCUMENTS

| | | | |
|---|---|---|---|
| 6,212,420 B1 * | 4/2001 | Wang et al. | 600/407 |
| 6,246,784 B1 * | 6/2001 | Summers et al. | 382/128 |
| 6,845,175 B2 * | 1/2005 | Kopelman et al. | 382/154 |
| 7,113,623 B2 * | 9/2006 | Chen et al. | 382/128 |
| 2003/0210820 A1 * | 11/2003 | Lachner et al. | 382/209 |
| 2003/0223627 A1 * | 12/2003 | Yoshida et al. | 382/128 |
| 2004/0013290 A1 * | 1/2004 | Krishnan et al. | 382/128 |
| 2004/0141638 A1 * | 7/2004 | Acar et al. | 382/131 |
| 2005/0152588 A1 * | 7/2005 | Yoshida et al. | 382/128 |
| 2006/0126920 A1 * | 6/2006 | Rust | 382/154 |
| 2007/0025605 A1 * | 2/2007 | Bohm et al. | 382/128 |

FOREIGN PATENT DOCUMENTS

JP 2005013729 A * 1/2005

OTHER PUBLICATIONS

Yoshida, H.—"Computer-aided diagnosis scheme for detection of polyps at CT Colonography"—Radio Graphics 2002—22: pp. 963-979—Imaging & Therapeutic Technology.*

(Continued)

*Primary Examiner* — Bernard Krasnic
(74) *Attorney, Agent, or Firm* — McAndrews, Held & Malloy, Ltd.; Rick Wascher

(57) ABSTRACT

A system and method for displaying a set of data with a virtually dissected anatomical structure. In an embodiment, the anatomical structure is a colon and various attributes of the colonic lumen are assigned a color. In an embodiment, a virtual dissection of the colon is created by mapping a three-dimensional data set to a two dimensional data set. A plurality of display index values are computed which correspond to the three-dimensional data set. Various colors are assigned to specific display index values. The three-dimensional display index values are mapped to a two-dimensional set of display index values. As directed by a user, various color cues may be displayed with the virtually dissected lumen to provide color highlights to various aspects of the colon, such as highlighting shape, fluid, or fecal presence.

24 Claims, 8 Drawing Sheets

OTHER PUBLICATIONS

Haker, S.—"Nondistorting flattening maps and the 3-D visualization of colon CT images"—IEEE—vol. 19, No. 7, pp. 665-670, Jul. 2000.*

Balogh, E.—"Virtual dissection of the colon: technique and first experiments with artificial and cadaveric phantoms"—SPIE—vol. 4681, pp. 713-721, May 2002.*

Bartroli, A.—"Nonlinear Virtual Colon Unfolding"—IEEE—pp. 411-418, Oct. 2001.*

Dev, P.—"Imaging and visualization in medical education"—IEEE—vol. 19, issue 3, pp. 21-31, May-Jun. 1999.*

Summers, R.—"Automated Polyp Detector for CT Colonograyp: Feasibility Study"—Radiology 2000; 216: pp. 284-290.*

Summers, R.—"Challenges for computer-aided diagnosis for CT colonograpy"—2002—Abdom Imaging 27: pp. 268-274.*

Yoshida, H and Nappi, J. *"Three-Dimensional Computer-Aided Diagnosis Scheme for Detection of Colonic Polyps"*, IEEE Trans. Medical Imaging, vol. 20, No. 12, pp. 1261-1274, 2001.

Dorai, C. and Jain, A. K. *"COSMOS—A Representation Scheme for 3D Free-Form Objects"*, IEEE Trans. Pattern Analysis and Machine Intelligence, vol. 19, No. 10, pp. 1115-1130, 1997.

Bartroli, A.V., Wegenkittl, R., Konig, A., and Grolier, E. *"Virtual Colon Unfolding"*, IEEE Proceedings: Visualization, pp. 411-418, 2001.

Jain, A.K, *Fundamentals of Digital Image Processing,* Englewood Cliffs, New Jersey: Prentice Hall, 1989.

* cited by examiner

SYSTEM AND METHOD FOR OVERLAYING COLOR CUES ON A VIRTUAL REPRESENTATION OF AN ANATOMICAL STRUCTURE

BACKGROUND OF THE INVENTION

Embodiments of the present invention generally relate to a system and method for image processing, and particularly to a system and method for overlaying a set of coded data on a virtually dissected anatomical structure.

Medical diagnostic imaging systems encompass a variety of imaging modalities, such as x-ray systems, computerized tomography (CT) systems, ultrasound systems, electron beam tomography (EBT) systems, magnetic resonance (MR) systems, and the like. Medical diagnostic imaging systems generate images of an object, such as a patient, for example, through exposure to an energy source, such as x-rays, passing through a patient, for example. The generated images may be used for many purposes. For instance, internal defects in an object may be detected. Additionally, changes in internal structure or alignment may be determined. Fluid flow within an object may also be represented. Furthermore, the image may show the presence or absence of certain features within an anatomical structure. Information derived from medical diagnostic imaging may be applied in many fields, including medicine and manufacturing.

One particular application is in the diagnosis and treatment of cancer. Although there are many different kinds of cancer, they all share a common cause: an uncontrollable growth of abnormal cells. As most cancer cells grow and accumulate, they form a tumor. Medical diagnostic imaging allows various sections of the human body to be examined for cancerous cells and tumors.

A particular type of medical diagnostic imaging used in detecting cancerous growths is tomographic reconstruction. Tomographic reconstruction creates two-dimensional or three-dimensional images from image data projections (such as x-ray projections) generated in an image acquisition system. Data from multiple projections are combined to produce an image representing an object. Often, two-dimensional slices are reconstructed from scans of a three-dimensional object. The two-dimensional slices may be combined to construct a three-dimensional image. These two or three-dimensional images may be viewed by a physician, or other health care practitioners, in search of cancerous growths, for example.

Not all forms of cancerous growths, however, are easily detected using tomographic reconstruction. One such area is that of colorectal cancer. Excluding skin cancers, colorectal cancer is the third most common cancer diagnosed in both men and women in the United States. The American Cancer Society estimates that about 105,500 new cases of colon cancer (49,000 men and 56,500 women) and 42,000 new cases of rectal cancer (23,800 men and 18,200 women) will be diagnosed in 2003. Colorectal cancer is expected to cause about 57,100 deaths (28,300 men and 28,800 women) during 2003.

Colorectal cancers are thought to develop slowly over a period of several years. Most colorectal cancers begin as a polyp, which is a mass of tissue that grows into the center of the tube that makes up the colon or rectum. Once a cancer forms in these polyps, the cancer may grow into the center of the colon or rectum. The cancerous polyp may also grow into the wall of the colon or rectum where the cancer cells may grow into blood vessels. From these vessels, the cancer cells may then break away, spreading to other parts of the body.

Although colon cancer is the third most common cancer diagnosed and the second largest cause of cancer related death in the United States, it has been estimated that up to ninety percent of colon cancers may be prevented. Colonic polyps develop slowly and may take years before becoming cancerous. If polyps are found early, they may be removed before they develop into cancer, or if they are already cancerous, they may be removed before the cancer spreads. Thus, one of the keys to preventing colon cancer is screening for potential cancerous polyps. The importance of screening is further magnified because most colonic polyps do not produce any symptoms, and nearly seventy-five percent of people who develop colon cancer have no risk factors for the disease, yielding no warning for the onset of cancer.

One of the tools available to aide in the screening for colon cancer is a virtual dissection. A virtual dissection, much like an actual dissection, is a view of the interior of an anatomical structure after the structure has been cut open. However, the difference between an actual dissection and a virtual dissection is that a virtual dissection is a computer-generated image, and no cutting is necessary. Also, a virtual dissection may be used to view the interior of living tissue. For example, a virtual dissection may be used to view the interior of various human anatomical structures due to the fact that a virtual dissection may be performed using a scan, such as a CT scan.

A virtual dissection may be used to display a lumen of an anatomical structure, such as a colon. A lumen is an interior wall of an object. As an example, if the object were a colon, the virtual dissected view of the colonic lumen would be a two dimensional computerized reconstruction of the scanned colon wall if it were cut open, dissected, and laid flat on a table. A user may observe the virtual dissected image for potentially cancerous polyps.

Currently, however, it is difficult to identify potentially cancerous polyps in a virtually dissected view. In current systems, a user manually inspects the virtual dissection for cancerous polyps without any visual cues as to the various structures of the colon. Hence, cancerous polyps may "blend in" with the background folds and structures of the lumen, causing the polyps to go undetected. Also, a user may not be aware of excess liquid or fecal matter that may be concealing a cancerous polyp. The lack of visual cues in current systems may cause potentially cancerous polyps to go undetected.

Moreover, the time required to interpret a virtually dissected view is typically long due to the fact that such analysis is done by a human observer. Once the virtually dissected view is created, a human interprets the virtual dissection and visually inspects the dissection for structures that may potentially be cancerous polyps. A human is naturally susceptible to error, and inspections may yield false negatives or false positives, resulting in misdiagnosis or unnecessary surgery. Even correct diagnosis is typically long due to the manual, imprecise nature of the analysis.

Therefore, a need exists for a system and method that provides visual cues on a virtual dissected view of the colonic lumen. Such a system and method may be used to increase the probability of locating cancerous polyps and decrease interpretation time.

SUMMARY OF THE INVENTION

Certain embodiments of the present invention provide a system and method for displaying a set of data with a virtually dissected anatomical structure. In an embodiment, a method involves creating a virtual dissection of the anatomical structure by mapping a first set of data of the anatomical structure to a second set of data of the anatomical structure. The first set of data may be three dimensional and the second set of data may be two dimensional. Display index values are then computed which correspond to the first set of data. Next, display attributes are assigned to display index values. The display index values are then mapped from the first set of data to a third set of data. The third set of data may be two dimensional. Next, display attributes are organized in preparation for display. Finally, the third set of data is displayed with the virtually dissected anatomical structure.

In an embodiment, a system overlays a set of data on a virtually dissected anatomical structure. The system comprises a virtual dissection unit for creating a virtual dissection of the anatomical structure. The virtual dissection is created by mapping a first set of data to a second set of data. The system also comprises a computation unit for computing display index values corresponding to the first set of data. The system also comprises an assignment unit for assigning display attributes to the display index values. The system also comprises a mapping unit for mapping the display index values from a first set of data to a third set of data. Finally, the system comprises an overlay unit for organizing the third set of data for display with the virtually dissected anatomical structure.

In an embodiment, the anatomical structure may be a colon and the display attributes may be color. The display index values may be highlighted according to user input. The highlighted display index values may be shape data, fluid data, or contrast enhanced fecal matter data, for example. Moreover, as explained above, the first set of data may be three dimensional and the second and third sets of data may be two dimensional.

The system and method of the invention allows portions of a virtually dissected colon to be highlighted on a display. Highlighting may allow a user to identify various structures of the virtual dissection for faster and easier identification. For example, a particular application of an embodiment of the invention may be used to instruct the display unit to display the virtual dissection of a colon created from three dimensional CT data. Then a user may instruct the display unit to display the shape information of the colon. The shape information may be highlighted to enhance the features of the virtual dissection. Also, a user may instruct the display unit to highlight any liquid in the colon. Similarly, a user may instruct the display unit to display any contrast enhanced fecal matter in the colon, for example. Such improvements in CT examination capabilities increase the possibility of using a CT examination for large scale screening for colonic polyps, and other identification operations, for example.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

DETAILED DESCRIPTION OF THE INVENTION

Figure 1:
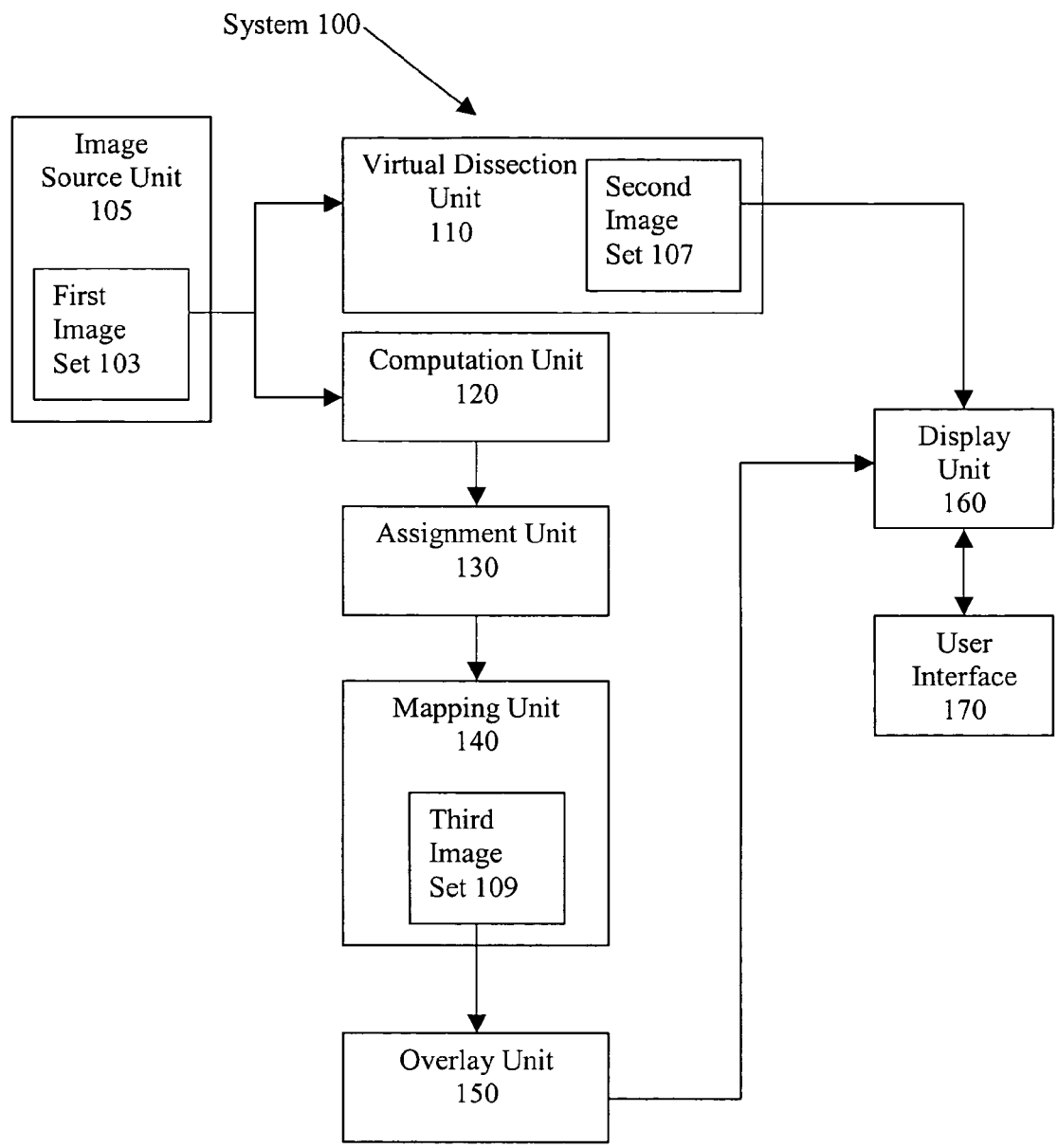
FIG. 1 illustrates a block diagram of an image processing system for overlaying a set of coded data on a virtually dissected lumen of a tubular structure, according to an embodiment of the present invention.

FIG. 1 illustrates an image processing system 100 according to an embodiment of the present invention. The system 100 includes an image source unit 105 which serves as a source for a first image set 103. The first image set 103 is manipulated at various points in the system 100 to generate a second image set 107 and a third image set 109. The second image set 107 and a third image set 109 are derivatives of the first image set 103. Moreover, the system 100 includes a virtual dissection unit 110 and a computation unit 120 in electrical communication with the image source unit 105. The system 100 also includes an assignment unit 130, a mapping unit 140, an overlay unit 150, a display unit 160, and a user interface, 170 in electrical communication with each other, the computation unit 120 and the virtual dissection unit 110. The components of the system 100 may be separate units, may be integrated in various forms, and may be implemented in hardware and/or in software.

The system 100 acquires a first image set 103 from the image source unit 105. The image source unit 105 communicates the first image set 103 to the virtual dissection unit 110 and the computation unit 120. The virtual dissection unit 110 manipulates the first image set 103, and transforms the first image set 103 into a second image set 107. The second image set 107 is then communicated to the display unit 160, where the second image set 107 may be displayed on display unit 160 upon instruction from the user interface 170.

The computation unit 120 manipulates the first image set 103 and communicates the results with the assignment unit 130. The assignment unit 130 manipulates the first image set 103 and transmits the results to the mapping unit 140. The mapping unit 140 manipulates the first image set 103 and transforms the manipulated first image set 103 into a third image set 109. The mapping unit 140 then sends the third image set 109 to the overlay unit 150. The overlay unit 150 manipulates the third image set 109 in such a way that the third image set appears to "lay on top" of the second image set 107 when the third image set 109 and second image set 107 are both displayed on display unit 160. Various portions of the third image set 109 may be displayed separately to highlight various portions of the second image set 107. Each unit is explored further below.

Referring again to FIG. 1, the image source unit 105 serves as a source of image data. In the system 100, the first image set 103 is the image data received from the image source unit 105. The image source unit 105 may be imaging equipment that is directly or indirectly connected to the system 100. Examples of a direct connection may be computerized tomography (CT) systems, ultrasound systems, electron beam tomography (EBT) systems or magnetic resonance (MR) systems. An example of an indirect connection may be imaging equipment connected to an image storage unit, such as a picture archiving and communications system (PACS), which is connected to the system 100 over a data network. Any method and apparatus capable of generating or delivering images and image sets may be suitable for use with the system 100.

Figure 2:
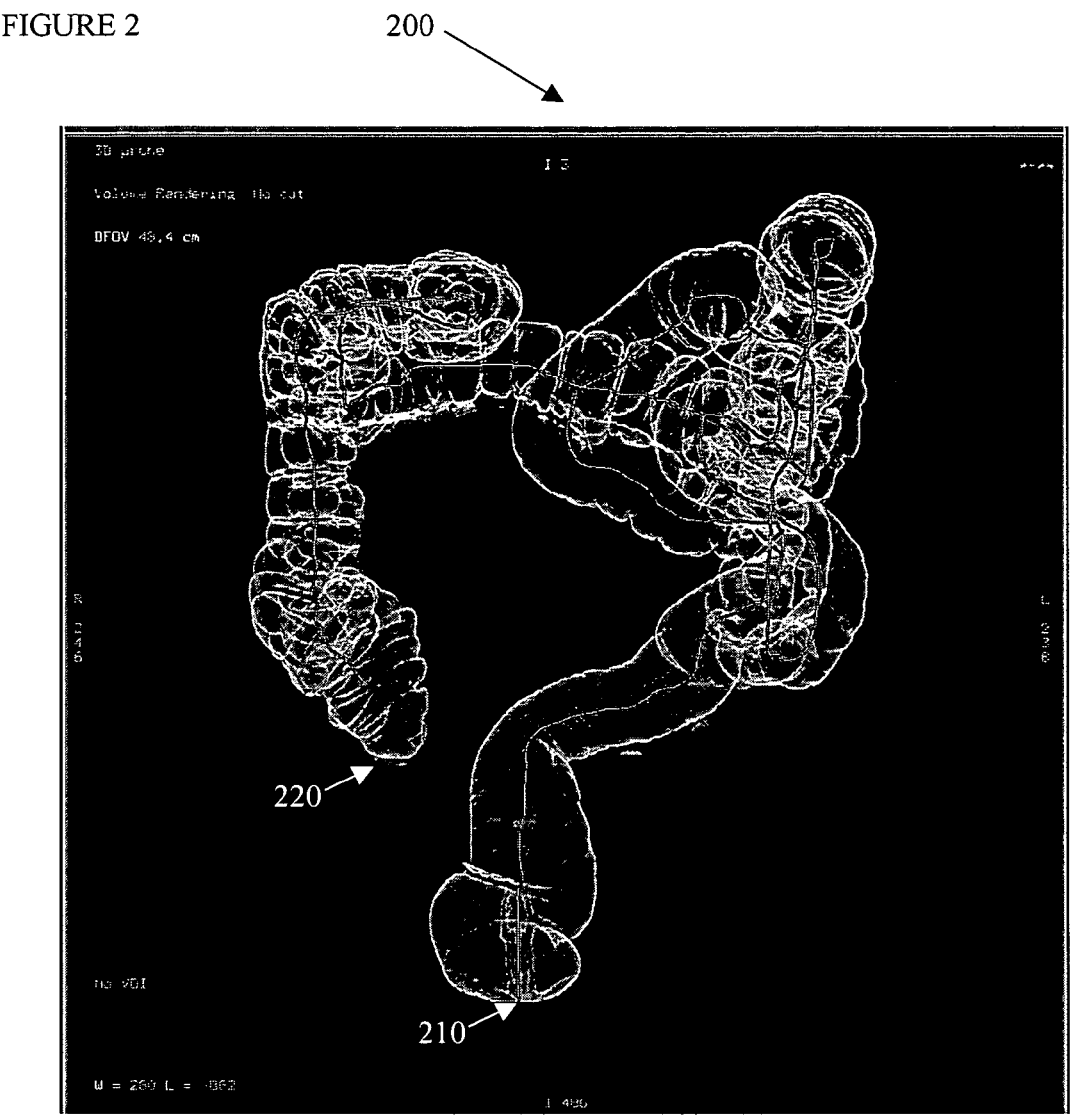
FIG. 2 is an illustrated example of a segmented view of a colon according to an embodiment of the present invention.

Moreover, the first image set 103 may be any set of image data. The first image set 103 may contain single or multiple images in any dimension. The first image set 103 may be three dimensional data. The three dimensional data may have been generated from a CT scan, an MR system or EBT system as described above, or any other system capable of producing images. An example of a first image set 103 that may be used with the system 100 is three dimensional CT image data as shown in FIG. 2. FIG. 2, illustrates as an example, a segmented view 200 of a colon that may be used as a basis for the first image set 103 in accordance with an embodiment of the present invention. In FIG. 2, points 210 and 220 represent the respective ends of the colon.

Once acquired by the system 100, the first image set 103 is transmitted to the virtual dissection unit 110. The virtual dissection unit 110 manipulates the first image set 103, and transforms the first image set 103 into a second image set 107 for display on the display unit 160. As mentioned above, the first image set 103 may be three-dimensional data. In an embodiment, the virtual dissection unit 110 maps, or transforms, the first image set 103 from a three dimensional representation of a structure to a second image set 107 which may be a two dimensional representation of the structure. The two dimensional second image set 107 is then used to create a virtual dissection of the structure for display on display unit 160. If a structure is tubular, one technique to create a virtual dissection is to map the distance from a centerline of the structure. For example, the distance of coordinate x, y, and z from the centerline of a tubular structure may be mapped to x' and y' to create a virtual dissection. An example of a method of mapping a structure from three dimensions to two dimensions is discussed in Bartroli, A. V., Wegenkittl, R., Konig, A., and Groller, E. "Nonlinear virtual colon unfolding", IEEE Proceedings: Visualization, pp. 411-418, 2001, which is hereby incorporated by reference.

Figure 3:
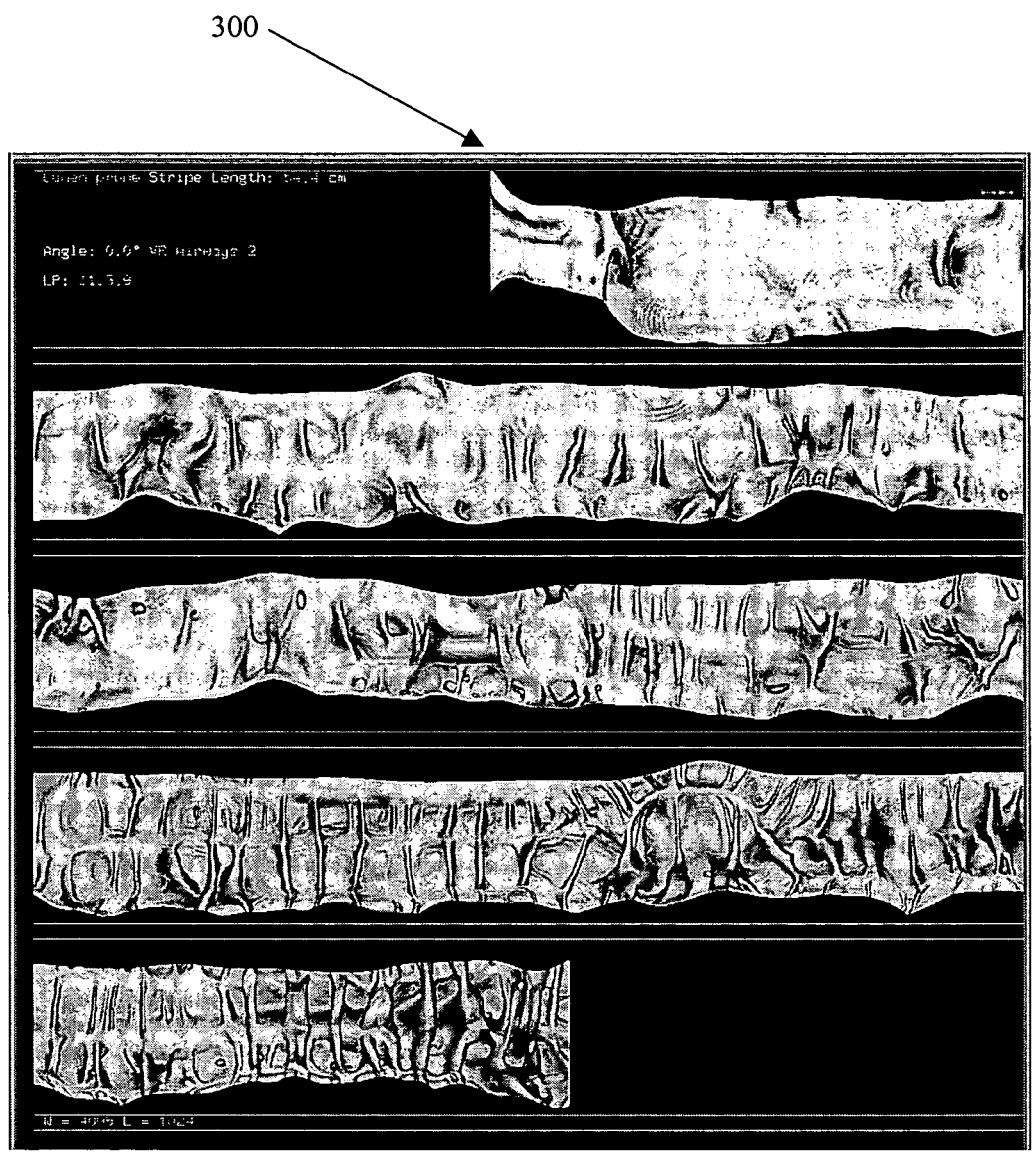
FIG. 3 is an illustrated example of a virtually dissected view of a human colon according to an embodiment of the present invention.

A virtual dissection may be performed on a human colon. FIG. 3 shows a virtually dissected view of a human colon 300. As mentioned above, FIG. 2 is a CT image of a segmented human colon 200. For explanatory purposes only, the virtually dissected view 300 may be created by virtually slicing the colon wall, or lumen, of the colon 200 (shown in FIG. 2) along a line parallel to the longitudinal axis of the colon 200, and folding the tubular shaped colon flat, figuratively speaking. For example, the colon 200 may be sliced parallel along a line that extends from the end of the colon 210 to the other end of the colon 220. As such, a user may view the interior wall of the virtually dissected colon in a similar fashion as one would view the colon during actual dissection.

Figure 4:
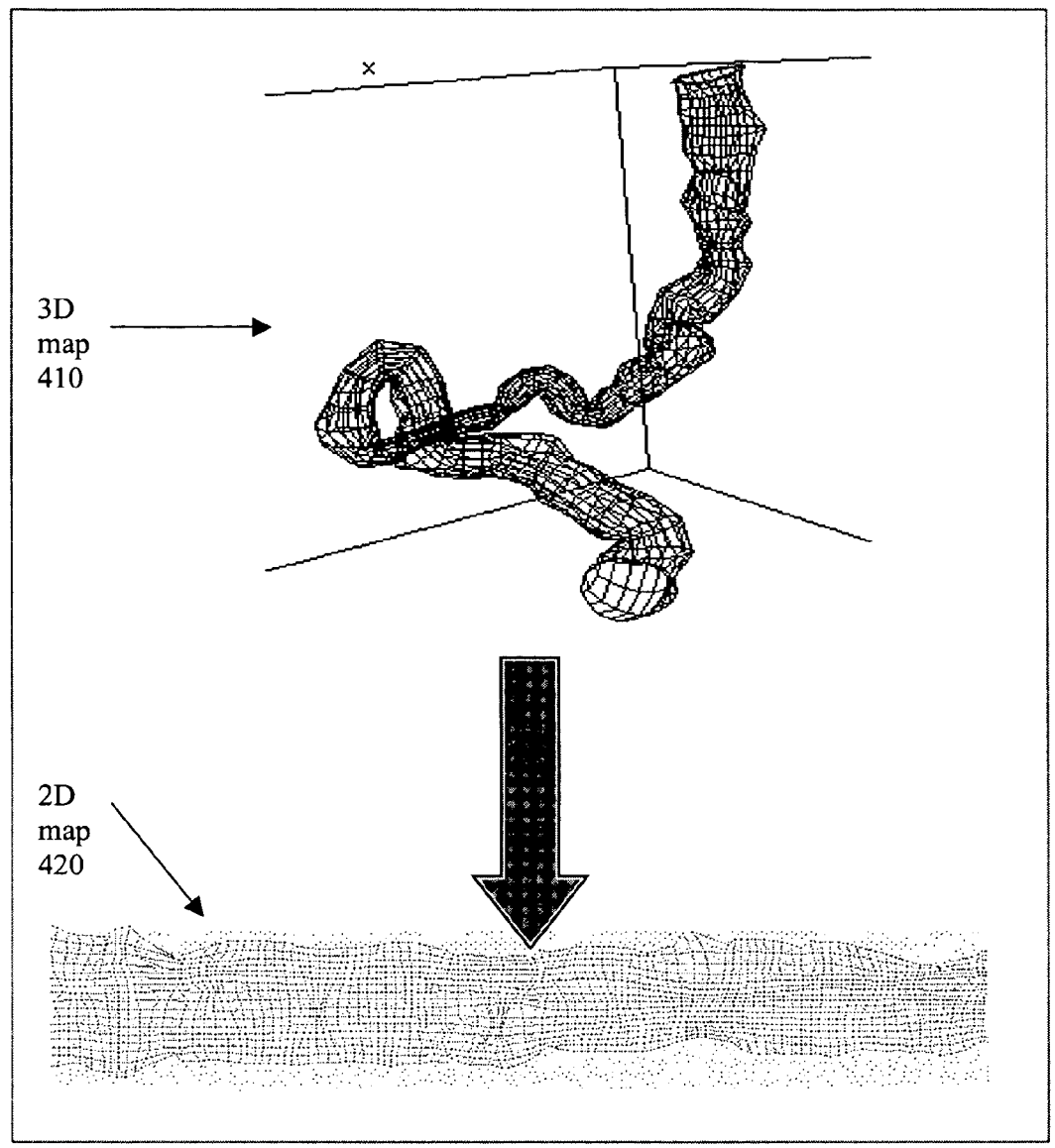
FIG. 4 illustrates a mapping of a three dimensional representation of a human colon to a two dimensional representation of a human colon, according to an embodiment of the present invention.

FIG. 4 is a wire frame view of FIG. 2 and illustrates mapping a three dimensional representation 410 of a human colon to a two dimensional representation 420 of a human colon. The three dimensional representation 410 may be used as the first image set 103. As an example, the virtual dissection unit 110 maps the three dimensional representation 410 to the two dimensional representation 420 to create the virtually dissected view 300.

Once the virtually dissected image is created by the virtual dissection unit 110, the virtual dissection may be viewed on the display unit 160 at the request of a user operating the user interface 170. FIG. 3 represents a possible appearance of a virtual dissection 300 on display unit 160.

In the system 100, the first image set 103 is also transmitted to the computation unit 120. The computation unit 120 manipulates the first image set 103 and communicates the results with subsequent units to transform the first image set 103 into a third image set 109, which may be displayed together with the second image set 107, on the display unit 160.

Referring again to FIG. 1, the computation unit 120 generates a plurality of display index values corresponding to the first image set 103. The display index values are various indicators that represent information concerning the first image set 103. The display index values may be numerical values corresponding to the pixels composing the image. In an embodiment, each pixel composing the image is assigned a value corresponding to information about the pixel and the portion of the image the pixel represents. The pixel information may include shape information, curvature estimates, gradient information, difference information, and variance information, among others. The curvature estimates may be performed using a mean or Gaussian curvature estimate using a representation scheme or other local three dimensional curvature estimates. Alternatively, less than all pixels composing the image are assigned display index values.

The first image set 103 may be a three dimensional representation 410 of a human colon, as in FIG. 4. The computation unit 120 generates a plurality of display index values for the pixels representing the three dimensional image of the colon. For example, display index values may be based on various numerical ranges of shape or curvature information, which may yield information about the colon. Different ranges of shape or curvature information may yield information regarding the shape of the colonic lumen, the location of fluid in the colon, or the location of contrast enhanced fecal matter within the colon. Each range of shape or curvature information may be assigned a different display index value. For example, the entire colonic lumen may be divided up into specific shapes. That is, the colonic lumen may be divided up into cups, ridges, ruts, saddles, and caps using the display index. Each range may then have different display index values.

The assignment unit 130 then uses the display index values to assign display attributes to the display index values. The display attributes are visual characteristics which allow the various ranges of display index values to be distinguished from one another, and the background, when displayed on the display unit 160. In an embodiment, the display attributes may be colors. Colors are assigned to different ranges of display index values. All pixels associated with a particular range of display index values may be assigned a particular color. For example, the display index values assigned to the shape of the colonic lumen may be assigned the color magenta. The display index values assigned to the location of fluid in the colon may be assigned a lime color. Moreover, if the shape of the colonic lumen is further divided up, the shapes of cups, ridges, ruts, saddles, and caps may all be assigned different colors.

Once the display index values are assigned various display attributes, the mapping unit 140 maps, or transforms, the display index values from the first image set 103 into a third image set 109. As mentioned above, the first image set 103 may be three-dimensional data. In an embodiment, the mapping unit 140 maps, or transforms, the first image set 103 from three dimensional display index values to a third image set 107 which may be two dimensional display index values. The transformation of three dimensional to two-dimensional mapping is accomplished in a similar fashion as discussed above with reference to creating a virtual dissection. However, in an embodiment, instead of distance mapping which may be used to create a virtual dissection, the mapping of the display index values may utilize shape mapping. In shape mapping, a shape attribute is mapped from three dimensions to two dimensions as opposed to mapping the distance from the centerline of a tubular structure from three dimensions to two dimensions.

The overlay unit 150 serves to organize the third image set 109 in preparation for display on the display unit 160. The overlay unit 150 organizes the third image set 109 in such a way that the third image set 109, or a portion of the third image set 109, may be displayed on the display unit 160 with the second image set 107. The overlay unit 150 also serves to store the third image set 109 until a user requests the third image set 109 for display. The overlay unit 150 may segment the display index values upon a user request to display only a particular feature of the structure. For example, if a user requests to only see shape information of a virtually dissected colon, the overlay unit 150 permits only the display index values designated as shape information to be displayed. Alternatively, the overlay unit 150 permits display index values other than shape information to be displayed, for example, but only some display values are visible to a user.

The user interface 170 may control the images displayed on the display unit 160. In operation, a user may instruct the display unit 160 to display the virtual dissection of the second image set 107 generated by the virtual dissection unit 110. A user may also instruct the user interface 170 to display the various display attributes as created in the third image set 109. The desired display attributes of the third image set 109 may serve to highlight desired portions of the second image set 107.

For example, the user may instruct the display unit 160 to display a virtual dissected view 300 of the colon as in FIG. 3. A user may also instruct the display unit 160 to display shape information, for example, of the virtual dissection 300. The data set for displaying the virtual dissection 300 may be the second image set 107. The second image set 107 may be displayed on display unit 160. The data set containing shape information of the virtual dissection 300 is the third image set 109. The third image set 109 may be displayed on display unit 160. In the example where only shape information is requested, the second image set 107 and the portion of the third image set 109 corresponding to shape information, are displayed on display unit 160. Alternatively, a user may request the display of liquid in the colon, or contrast enhanced fecal matter, among other things.

Figure 5:
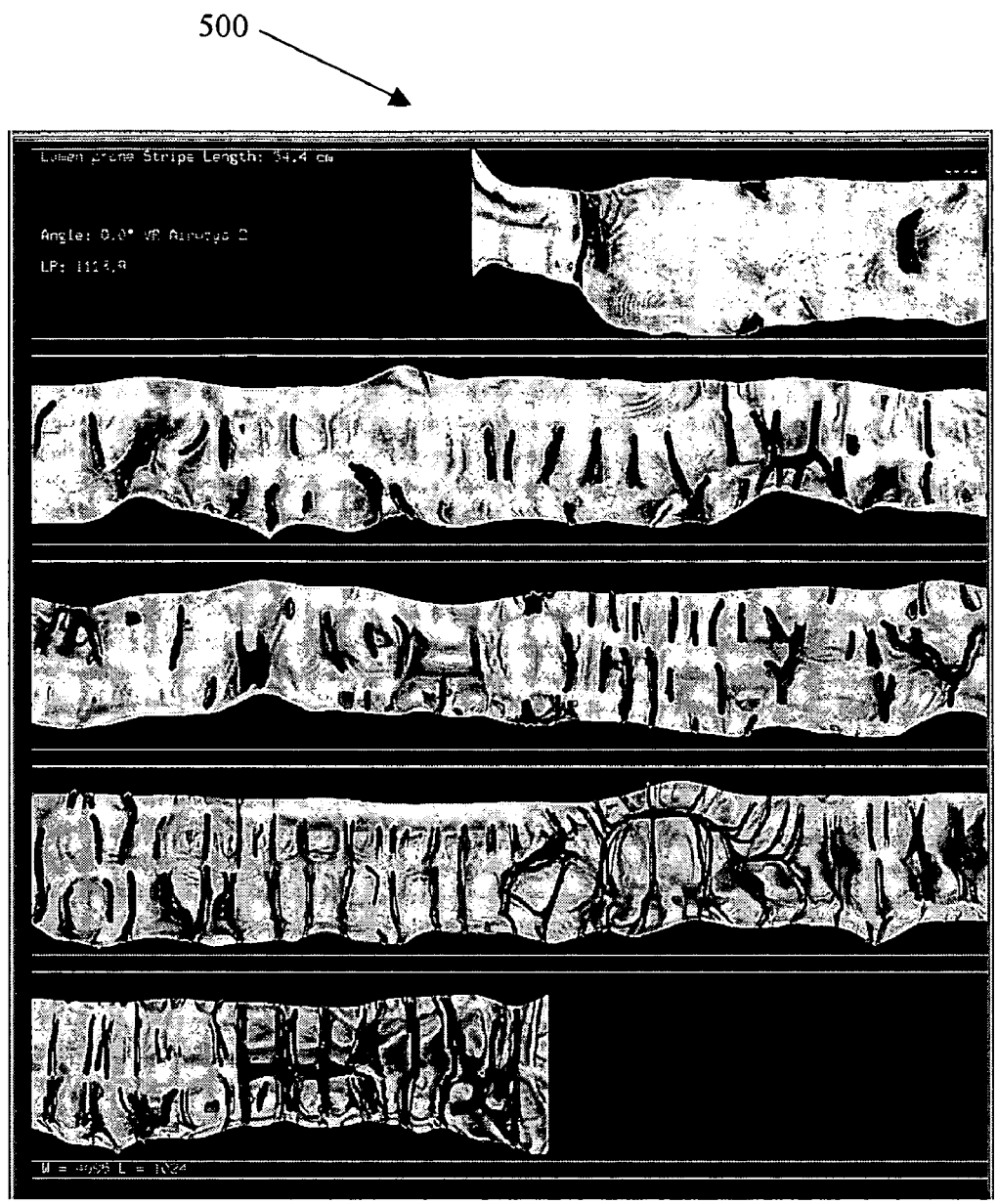
FIG. 5 illustrates a virtual dissected view of a colon overlaid with shape index values from the display index, according to an embodiment of the present invention.

To a user, the joint display of the second image set 107 and the third image set 109 may result in various portions of the virtual dissection appearing highlighted. FIG. 5 illustrates a virtually dissected view of a colon 500 having shape index values highlighted in a magenta color, for example. A user requesting to see shape information of a virtually dissected colon 300 may view the virtually dissected colon 500, with desired shape information highlighted as displayed on display unit 160.

Figure 6:
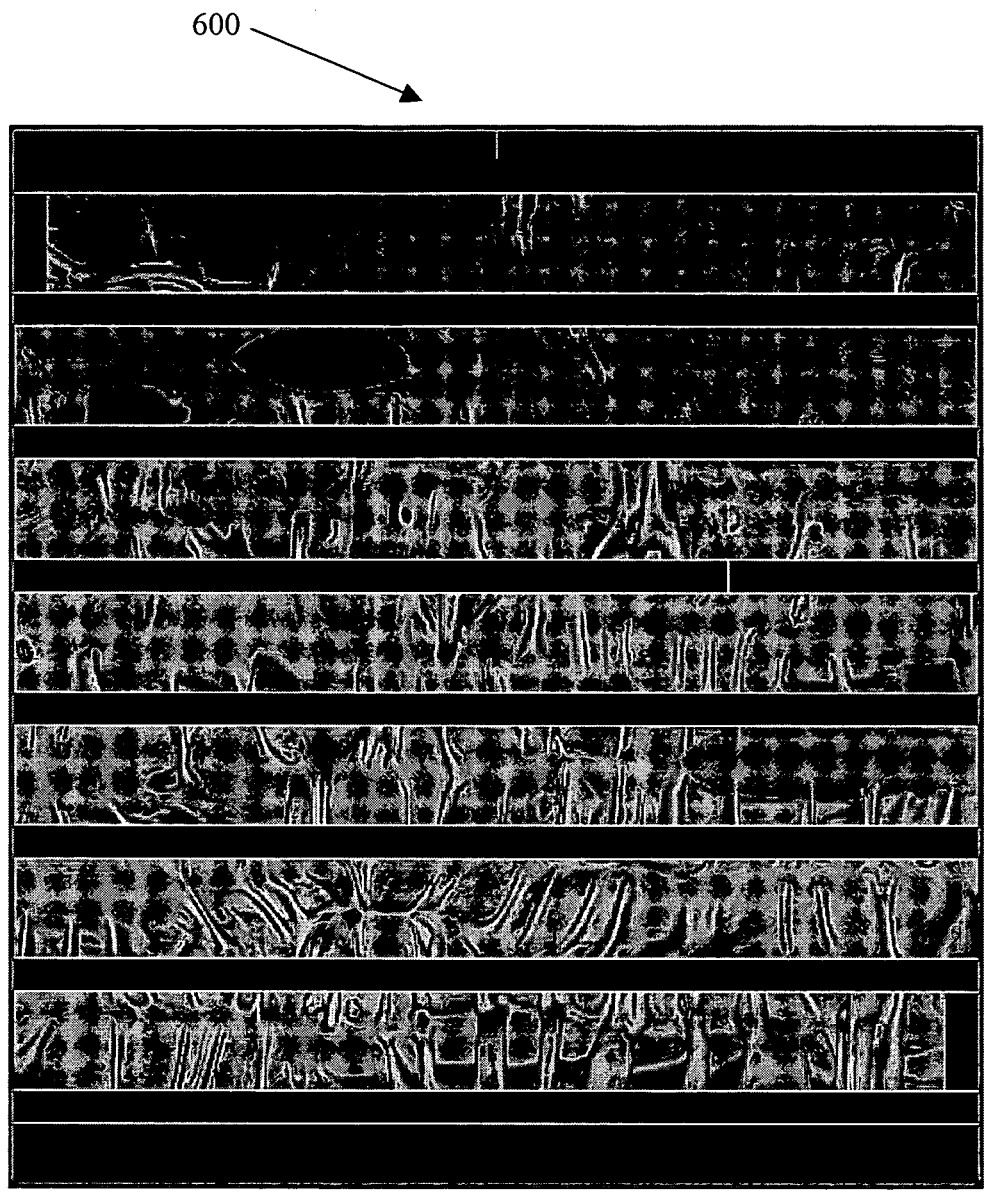
FIG. 6 illustrates a virtual dissected view of a colon overlaid with fluid index values from the display index, according to an embodiment of the present invention.

Similarly, FIG. 6 illustrates a virtual dissected view of a colon 600 having fluid index values highlighted in a lime color, for example. A user requesting to see the location of fluid of the virtually dissected colon 300 may view the virtually dissected colon 600, with desired fluid information highlighted. In a similar fashion, a user requesting to view the location of contrast enhanced fecal matter of the virtually dissected colon 300 may view the virtually dissected colon with desired fecal matter highlighted. Any object or virtually dissected entity may be highlighted in any desired color.

Figure 7:
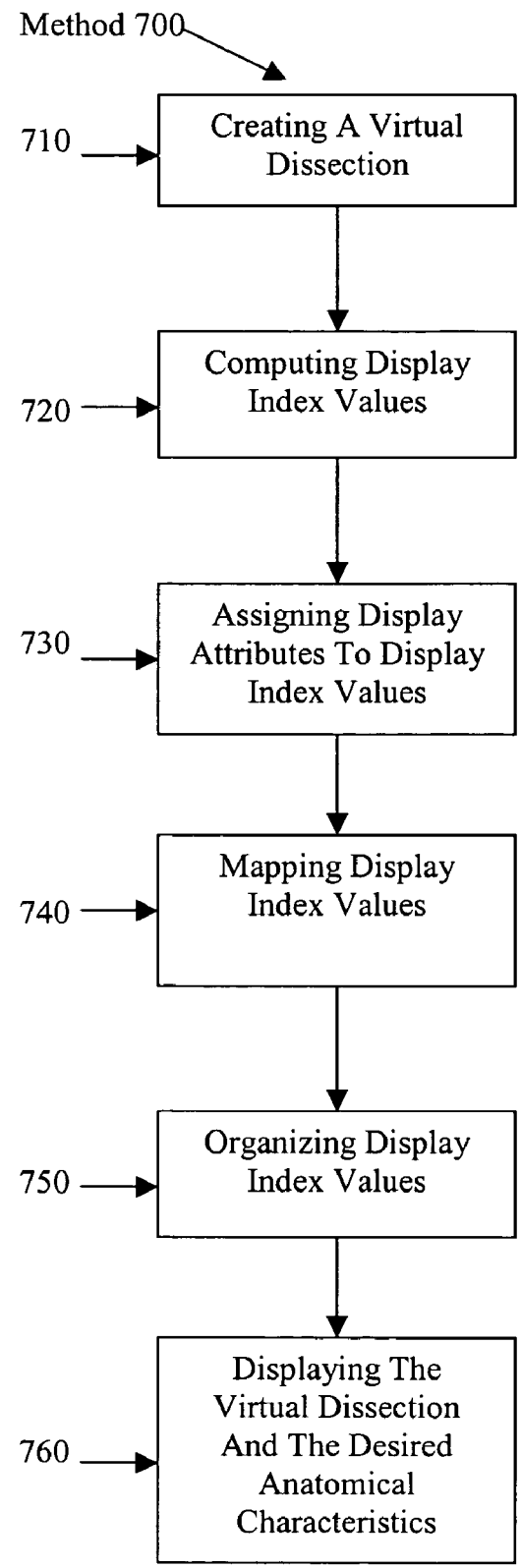
FIG. 7 illustrates a flow diagram for a method of overlaying a set of coded data on a virtually dissected lumen according to an embodiment of the present invention.

FIG. 7 illustrates a flow diagram for a method 700 displaying a set of data on a virtually dissected anatomical structure according to an embodiment of the present invention. First, at step 710, a virtual dissection of the anatomical structure is created. Next, at step 720, the display index values are computed. Then, at step 730, the display attributes are assigned to display index values. Next, at step 740, the display index values are mapped from a first data set to a second data set. Then, at step 750, the display index values are organized in preparation for display. Finally, at step 760, the virtual dissection and desired anatomical characteristics are displayed. Each of these steps is described in more detail below.

At step 710, a virtual dissection of a structure is created. As mentioned above, a virtual dissection is a computer generated view of the interior of an anatomical structure after the structure has been cut open. In an embodiment, a virtual dissection may be created by mapping a three dimensional image set into a two dimensional image set. The two dimensional image set may then be displayed as if the three dimensional anatomical structure is cut open and laid flat on a table. As such a user may view the interior of the structure.

Next, at step 720, a plurality of display index values are generated corresponding to the first image set 103. In an embodiment, the display index values correspond to a three dimensional structure. The display index values may be various indicators or numerical values corresponding to the pixels composing the image. In an embodiment, each pixel composing the image is assigned a value corresponding to information about the pixel the section of the image the pixel represents. The pixel information may include shape information, curvature estimates, gradient information, difference information, and variance information, among others. Hence, for example, a display index value may be assigned corresponding to a structure's shape. In an embodiment, the curvature estimates may be performed using a mean or Gaussian curvature estimate using a representation scheme or other local three dimensional curvature estimates. Alternatively, less than all pixels composing the image are assigned display index values.

At step 730, the display index values are assigned display attributes. The display attributes are visual characteristics which allow the various ranges of display index values to be distinguished from one another, and the background, when displayed. In an embodiment, the display attributes may be colors. Colors are assigned to different ranges of display index values. All pixels associated with a particular range of display index values may be assigned a particular color. For example, the display index values assigned to the shape of the colonic lumen may be assigned the color magenta. The display index values assigned to the location of fluid in the colon may be assigned a lime color. Moreover, if the shape of the colonic lumen is further divided up, the shapes of cups, ridges, ruts, saddles, and caps may all be assigned different colors. Alternatively, less than all pixels associated with a particular range of display index values may be assigned a particular color.

At step 740, the display index values are mapped, or transformed to a set of data capable of being displayed in two dimensions. In an embodiment, display index values are mapped from three dimensional to two dimensional data. The conversion from three dimensional to two-dimensional may be accomplished in a similar fashion as discussed above with reference to creating a virtual dissection and FIG. 4.

At step 750, the display attributes may organized in preparation for display with the virtual dissection. The display attributes may be organized according to the portion of the structure each attribute may emphasize, among other ways. In an embodiment, the display attributes may be organized by color associated with shape data, fluid data, or fecal data.

At step 760, the virtual dissection and the desired anatomical characteristics are displayed. A user may display the virtual dissection of the structure and also display some or all characteristics associated with the display attributes of the structure. As the characteristics of the structure may be assigned colors, the joint display of the characteristics and the virtual dissection may result in various portions of the virtual dissection appearing highlighted.

Figure 8:
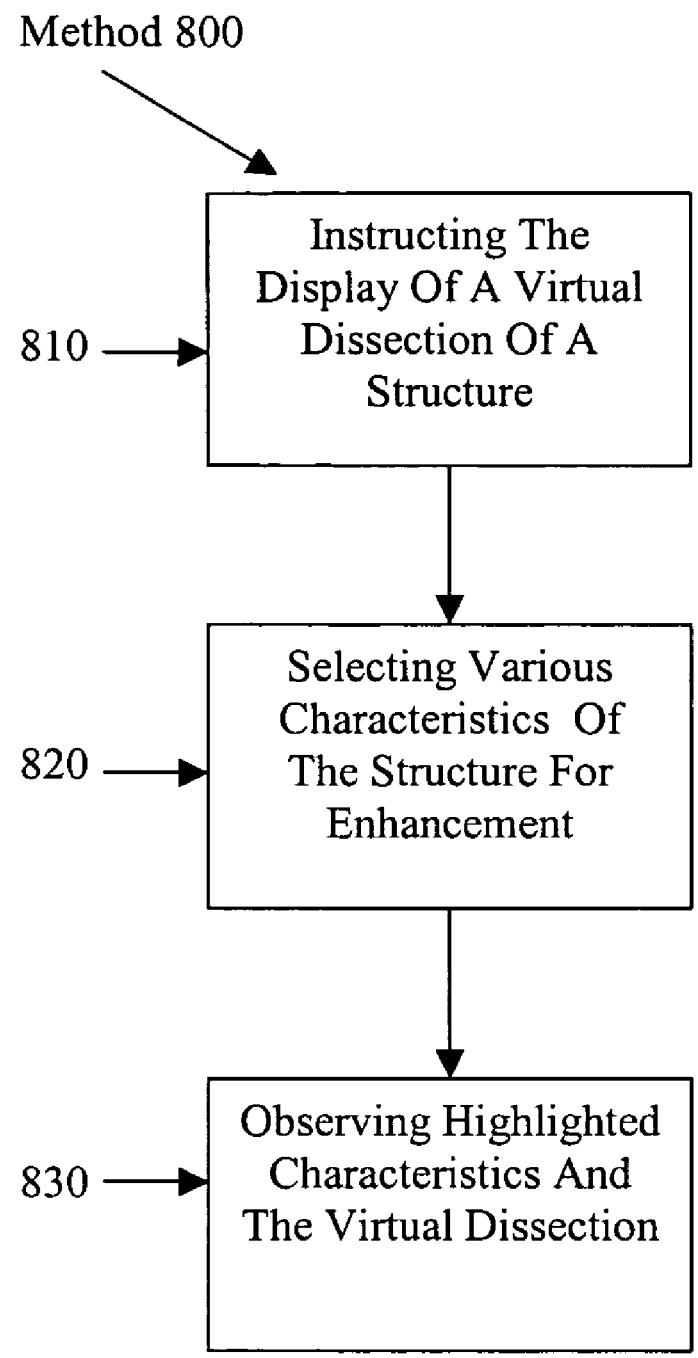
FIG. 8 illustrates a flow diagram for a method of viewing a virtually dissected colon, according to an embodiment of the present invention.

FIG. 8 illustrates a flow diagram for a method 800 for viewing a virtually dissected colon. First, at step 810, a user may instruct the display of a virtual dissection of an anatomical structure. Next at step 820, a user may select various characteristics of the structure for enhancement Finally, at step 830, a user may observe highlighted characteristics and the virtual dissection. Each of these steps will be developed more fully below.

At step 810, a user may instruct the display of a virtual dissection. As mentioned above, a virtual dissection is a computer generated view of the interior of an anatomical structure after the structure has been cut open. In an embodiment, a virtual dissection may be created by mapping a three dimensional image set into a two dimensional image set. The two dimensional image set may then be displayed as if the three dimensional anatomical structure is cut open and laid flat on a table. As such a user may view the interior of the structure.

At step 820, a user may select various characteristics of the structure for enhancement. The various characteristics may be shape, liquid, or fecal matter, among others. Subcategories of characteristics may be created and chosen for enhancement. For example, if the characteristic chosen is shape, subcategories of shapes may be cup, rut, saddle, ridge, and cap.

At step 830, a user may observe highlighted characteristics of the structure together with the virtual dissection of the structure. The highlighted characteristics may be displayed at once, or individually. In an embodiment, highlighting is performed with different colors. Any colors may be used to distinguish the characteristics from each other and the virtual dissection.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for displaying a set of data with a virtually dissected anatomical structure, said method comprising:
    performing by one or more computing devices, at least:
        creating a virtual dissection of the anatomical structure by mapping a first set of data of the anatomical structure to a second set of data of the anatomical structure;
        computing a plurality of display index values corresponding to object shapes in said first set of data;
        assigning display attributes to said display index values;
        distance mapping from a reference axis said display index values from the first set of data to a third set of data; and
        organizing said third set of data for display with the virtually dissected anatomical structure.

2. The method of claim 1, wherein the anatomical structure is a colon.

3. The method of claim 1, wherein the display attribute is color.

4. The method of claim 1, further comprising highlighting select said display index values according to user input.

5. The method of claim 4, wherein said highlighted select said display index values are shape data.

6. The method of claim 4, wherein said highlighted select said display index values are fluid data.

7. The method of claim 4, wherein said highlighted select said display index values are contrast enhanced fecal matter data.

8. The method of claim 1, wherein said first set of data is three-dimensional and said second and third sets of data are two-dimensional.

9. A system for displaying a set of data with a virtually dissected anatomical structure, said system comprising:
    a virtual dissection unit for creating a virtual dissection of the anatomical structure by mapping a first set of data to a second set of data, wherein the second set of data corresponds to the virtual dissection;
    a computation unit for computing display index values corresponding to object shapes in said first set of data;
    an assignment unit for assigning display attributes to said display index values;
    a mapping unit for distance mapping from a reference axis said display index values from the first set of data to a third set of data;
    an overlay unit for organizing said third set of data for display with the virtually dissected anatomical structure.

10. The system of claim 9, wherein the anatomical structure is the colon.

11. The system of claim 9, wherein the display attribute is color.

12. The system of claim 9, further comprising a highlighting unit for highlighting select said display index values according to user input.

13. The system of claim 12, wherein said highlighted select said display index values are shape data.

14. The system of claim 12, wherein said highlighted select display index values are fluid data.

15. The system of claim 12, wherein said highlighted select display index values are contrast enhanced fecal matter data.

16. The system of claim 9, wherein said first set of data is three-dimensional and said second and third sets of data are two-dimensional.

17. A non-transitory computer readable medium encoded with a computer executable program for displaying a set of data on a virtually dissected anatomical structure, said computer executable program comprising:
    creating a virtual dissection of the anatomical structure by mapping a first set of data of the anatomical structure to a second set of data of the anatomical structure;
    computing a plurality of display index values corresponding to object shapes in said first set of data;
    assigning display attributes to said display index values;
    distance mapping from a reference axis said display index values from the first set of data to a third set of data;
    organizing said third set of data for display with the virtually dissected anatomical structure.

18. The computer executable program of claim 17, wherein the anatomical structure is a colon.

19. The computer executable program of claim 17, wherein the display attribute is color.

20. The computer executable program of claim 17, further comprising highlighting select said display index values according to user input.

21. The computer executable program of claim 20, wherein said highlighted select said display index values are shape data.

22. The computer executable program of claim 20, wherein said highlighted select said display index values are fluid data.

23. The computer executable program of claim 20, wherein said highlighted select said display index values are contrast enhanced fecal matter data.

24. The computer executable program of claim 17, wherein said first set of data is three-dimensional and said second and third sets of data are two-dimensional.

* * * * *